(12) United States Patent
Craig et al.

(10) Patent No.: US 8,489,055 B2
(45) Date of Patent: Jul. 16, 2013

(54) ACTIVE INTERFERENCE SUPPRESSION IN A SATELLITE COMMUNICATION SYSTEM

(75) Inventors: Antony Duncan Craig, Hitchin (GB); Paul Stephen Norridge, Cambridge (GB); David Michael Howe, Stevenage (GB)

(73) Assignee: Astrium Limited, Hertfordshire (GB)

( * ) Notice: Subject to any disclaimer, the term of this patent is extended or adjusted under 35 U.S.C. 154(b) by 168 days.

(21) Appl. No.: 12/656,991

(22) Filed: Feb. 22, 2010

(65) Prior Publication Data

US 2010/0221997 A1 Sep. 2, 2010

Related U.S. Application Data

(63) Continuation-in-part of application No. 12/379,651, filed on Feb. 26, 2009.

(30) Foreign Application Priority Data

Nov. 14, 2008 (GB) .................................. 0820902.5

(51) Int. Cl.
*H04B 1/06* (2006.01)

(52) U.S. Cl.
USPC ...................... 455/278.1; 455/267.1; 370/208

(58) Field of Classification Search
USPC ..................................................... 455/278.1
See application file for complete search history.

(56) References Cited

U.S. PATENT DOCUMENTS

| | | | |
|---|---|---|---|
| 5,819,168 A | 10/1998 | Golden et al. | |
| 6,005,515 A * | 12/1999 | Allen et al. | 342/374 |
| 6,097,773 A | 8/2000 | Carter et al. | |
| 6,128,276 A * | 10/2000 | Agee | 370/208 |
| 6,188,915 B1 | 2/2001 | Martin et al. | |
| 6,700,923 B1 * | 3/2004 | Dowling et al. | 375/148 |
| 6,895,217 B1 | 5/2005 | Chang et al. | |
| 2004/0087294 A1* | 5/2004 | Wang | 455/276.1 |
| 2004/0259497 A1* | 12/2004 | Dent | 455/13.3 |
| 2005/0009492 A1 | 1/2005 | Mueller et al. | |

FOREIGN PATENT DOCUMENTS

| | | |
|---|---|---|
| EP | 0 462 699 | 12/1991 |
| EP | 0 570 166 | 11/1993 |
| GB | 2 245 102 | 12/1991 |
| JP | 5-122092 | 5/1993 |

(Continued)

OTHER PUBLICATIONS

International Search Report and Written Opinion of the International Searching Authority dated Jul. 29, 2010 for PCT/EP2009/065046.

(Continued)

*Primary Examiner* — Ajibola Akinyemi
(74) *Attorney, Agent, or Firm* — Nixon & Vanderhye, PC

(57) ABSTRACT

The invention relates to active interference suppression in a satellite communication system, particularly but not exclusively to an apparatus and method for using active interference suppression in order to suppress co-channel interference between user signals in the communication system. The communication system includes a receive or transmit antenna having a plurality of antenna elements, each antenna element associated with a respective antenna element signal. The method includes the steps of calculating complex weighting values for one or more of a plurality of beam signals, adjusting the beam signals in accordance with the calculated complex weighting values and cancelling co-channel interference in at least one of the beam signals using the one or more adjusted derived beam signals to provide an interference suppressed output signal. The complex weighting values can be calculated based on a constant modulus algorithm.

25 Claims, 6 Drawing Sheets

FOREIGN PATENT DOCUMENTS

| JP | 11-308130 | 11/1999 |
|---|---|---|
| JP | 2008-252850 | 10/2008 |
| WO | WO 2007/037714 | 4/2007 |
| WO | WO 2008/075099 | 6/2008 |

OTHER PUBLICATIONS

UK Search Report dated Mar. 30, 2009 for GB 0820902.5.

C.B. Papadias et al, "A Constant Modulus Algorithm for Multiuser Signal Separation in Presence of Delay Spread Using Antenna Arrays" IEEE Signal Processing Letters, vol. 4, No. 6, Jun. 1997, pp. 178-181.

Communication from European Patent Office dated May 7, 2012 in EP 09752175.1-2411.

Communication from European Patent Office dated Sep. 13, 2012 in EP 09 752 175.1-2411.

N. Herscovici et al, "Smart Antennas" *IEEE Antennas and Propagation Magazine*, vol. 42, No. 3, Jun. 2000, pp. 129-136.

Xu et al, "On CMA for Land Mobile LEO Satellite Communication Systems" EUROCOMM 2000, Information Systems for Enhanced Public Safety and Security, IEEE/AFCEA May 2000, pp. 194-198.

English translation of Japanese Office Action dated Apr. 23, 2013 in JP 2011-536011.

\* cited by examiner

ACTIVE INTERFERENCE SUPPRESSION IN A SATELLITE COMMUNICATION SYSTEM

This application is a Continuation-in-Part of application Ser. No. 12/379,651 filed Feb. 26, 2009, which claims priority to GB Application 0820902.5 filed 14 Nov. 2008, the entire contents of which are hereby incorporated by reference.

The invention relates to interference suppression in a satellite communication system, particularly but not exclusively to an apparatus, system and method for suppressing co-channel interference between multiple user signals sharing frequency channels in the satellite communication system.

Satellite communications systems increasingly use digital processing architectures within the payload design and the provision of coverage in the form of narrow spot beams. It is known to accurately define such narrow spot beams either with a multi-element antenna system, by beam-forming techniques involving assigning complex digital weights to each communication frequency channel for controlling spot beam parameters, or with a single port per beam antenna system.

The current trend is for the total number of users in communication systems to increase, while the bit-rate required by each user also increases. With the ever-increasing need for higher capacity, there is pressure on such systems to use bandwidth more efficiently. One way of achieving this is by maximising frequency reuse within the system where possible. For satellite systems, the principle re-use method involves the use of a number of the spot beams, each allocated to a user 'cell', where the spot beams share frequency resources.

The frequency reuse scheme varies between systems, but typical choices are referred to as 3-colour, 4-colour and 7-colour, in which 3, 4 or 7 frequencies are re-used across a regular hexagonal grid formation of spot beams, with 3-colour providing a higher concentration of frequency re-use in the system. Alternatively there may be an irregular geometry of beams which share the same frequency. To limit interference between users on the same 'channel', frequencies are therefore shared between non-adjacent beams only. The intention is that the spatial separation places interferers in side-lobes of a primary beam, minimising their effect on that beam. However, even within the sidelobes, interferers can cause significant signal degradation. One approach to reduce the effect of interferers is to increase the antenna size so as to reduce the level of sidelobes, reducing in turn the co-channel interference. However, this approach, in addition to being costly in terms of resources, could be considered inefficient since it places low gain over all possible interference locations, including at locations where an interferer is not necessarily present.

The present invention aims to address the limitations inherent in the prior art.

According to the invention, there is provided a method of suppressing co-channel interference in a satellite communication system, the satellite communication system including a receive antenna having a plurality of antenna elements, each antenna element arranged to provide a respective antenna element signal, the method comprising digitising each antenna element signal, and processing each digitised antenna element signal to separate received signal components in respective frequency channels present in the element signal, calculating complex weighting values for one or more of a plurality of beam signals derived from the received signal components in at least one frequency channel, adjusting one or more of the derived beam signals in accordance with the calculated complex weighting values, in the at least one frequency channel and cancelling interference in at least one derived beam signal in said at least one frequency channel using the one or more adjusted derived beam signals to provide an interference suppressed output signal.

The satellite communication system can further comprise a plurality of beam forming networks, the method further comprising digitally weighting, at each of said beam forming networks, with respective beam-forming weight values, said signal components of each of said frequency channels in order to derive the beam signals from the signal components.

The receive antenna can comprise a direct radiating array antenna, an array fed reflector antenna or an imaging phased array antenna.

Deriving the plurality of beam signals from the received signal components can be achieved by using each signal component in each frequency channel as a respective beam signal. The receive antenna can comprise a single feed per beam antenna.

Calculating complex weighting values can comprise using a constant modulus algorithm to determine the weighting values.

Furthermore, calculating complex weighting values may further comprise initialising the constant modulus algorithm in dependence on the geographical locations associated with the one or more of the derived beam signals to cancel interference in said at least one derived beam signal. By selecting appropriate initial complex weighting values, it can be ensured that the correct derived beam signal is accentuated. Instructions to select appropriate initial complex weighting values may be specified to the algorithm in a control signal.

Calculating complex weighting values can comprise correlating each of one or more of the derived beam signals with the interference suppressed output signal.

The method can further comprise adjusting the complex weighting values calculated for one or more of a plurality of beam signals in a first channel in order to determine complex weighting values for one or more of a plurality of beam signals in a second channel different from the first channel.

According to the invention, there is further provided an apparatus for suppressing co-channel interference in a satellite communication system, the satellite communication system including a receive antenna having a plurality of antenna elements, each antenna element arranged to provide a respective antenna element signal, the apparatus comprising an analogue to digital converter for digitising each antenna element signal, a plurality of demultiplexers for processing each digitised antenna element signal to separate received signal components in respective frequency channels present in the element signal, a processing arrangement for calculating complex weighting values for one or more of a plurality of beam signals derived from the received signal components in at least one frequency channel, a plurality of complex weighting units for adjusting one or more of the derived beam signals to form cancellation signals in accordance with the calculated complex weighting values, in the least one frequency channel, and a cancelling unit for cancelling interference in at least one derived beam signal in said at least one frequency channel using the one or more cancellation signals to provide an interference suppressed output signal.

The apparatus can further comprise a plurality of beam forming networks for digitally weighting, with respective beam-forming weight values, said signal components in each of said frequency channels in order to derive the beam signals from the signal components. The receive antenna can comprise a direct radiating array antenna, an array fed reflector antenna or an imaging phased array antenna. Alternatively, the plurality of beam signals can be derived from the received signal components by using each signal component in each frequency channel as a respective beam signal. The receive antenna can comprise a single feed per beam antenna.

The processing arrangement may be configured to calculate the complex weighting values using the constant modulus algorithm. The processing arrangement may be configured to select initial complex weighting values to suppress interference in the at least one derived beam signal based on instructions received in a control signal.

According to the invention, there is also provided a method of suppressing co-channel interference in a satellite communication system, the satellite communication system including an antenna having a plurality of antenna elements, each antenna element associated with a respective antenna element signal, the method comprising generating a plurality of beam signals in each of a plurality of frequency channels, the beam signals corresponding to one or more of the antenna element signals, calculating complex weighting values for one or more of the beam signals in at least one of the frequency channels, adjusting one or more of the beam signals in accordance with the calculated complex weighting values, in the at least one frequency channel and cancelling interference in at least one of the beam signals in said at least one frequency channel using the one or more adjusted beam signals to provide an interference suppressed output signal.

The antenna can comprise a receive antenna and the satellite communication system can further comprise a plurality of analogue beam forming networks. The method can further comprise adjusting, at each of said analogue beam forming networks, the gain and phase of a plurality of the antenna element signals in order to derive the beam signals.

The antenna can comprise a transmit antenna and the satellite communication system can further comprise a plurality of analogue beam forming networks. The method can further comprise deriving, at each of said analogue beam forming networks, each of the antenna element signals based on the beam signals.

According to the invention, there is also provided an apparatus for suppressing co-channel interference in a satellite communication system, the satellite communication system including an antenna having a plurality of antenna elements, each antenna element associated with a respective antenna element signal, the apparatus comprising a signal processing arrangement for generating a plurality of beam signals in each of a plurality of frequency channels, the beam signals corresponding to one or more of the antenna element signals, a processor arrangement for calculating complex weighting values for one or more of the beam signals in at least one of the frequency channels, a plurality of complex weighting units for adjusting one or more of the beam signals in accordance with the calculated complex weighting values, in the at least one frequency channel and a cancelling unit for cancelling interference in at least one of the beam signals in said at least one frequency channel using the one or more adjusted beam signals to provide an interference suppressed output signal.

According to the invention, there is also provided a satellite communication system comprising an antenna arrangement having a plurality of antenna elements, each antenna element associated with a respective antenna element signal and an apparatus according to the invention.

According to the invention, there is also provided a satellite communication system comprising an antenna arrangement having a plurality of antenna elements, each antenna element arranged to provide a respective antenna element signal, and an apparatus according to the invention.

Embodiments of the invention will now be described, by way of example, with reference to the accompanying drawings, in which.

A digital beam-forming architecture, together with a multi-element antenna system, provides flexible and independent reconfiguration of beams associated with different frequency channels. This may be used to provide global, shaped regional or narrow spot beams on an individual frequency channel basis. The ability to change the location of spot beams provides a means of routing capacity between different ground locations.

An important class of satellite antenna involves multiple elements where independent control of the amplitude and phase weighting, of signals applied to or received from the elements, or equivalently complex weighting of the signals in the digital domain, serves to determine the beam properties. Specifically within this class is the direct radiating array (DRA) also referred to as a direct phased array (where the aperture is formed by a 2 dimensional array of radiating elements), an imaging phased array (IPA) (where the aperture diameter of a primary DRA is magnified by means of antenna "optics" and in which a given beam is synthesised from multiple weighted individual feed or element signals), the array fed reflector (AFR) (where an array of feed elements are offset from the focal plane of a reflector such that the far field beam pattern associated with a given feed is directional and a given beam is typically synthesised from a weighted subset of the overall feed set) and a semi-focused reflector antenna. Also relevant are single feed per beam (SFPB) antennas, in which each individual feed corresponds to a particular beam.

Figure 1:
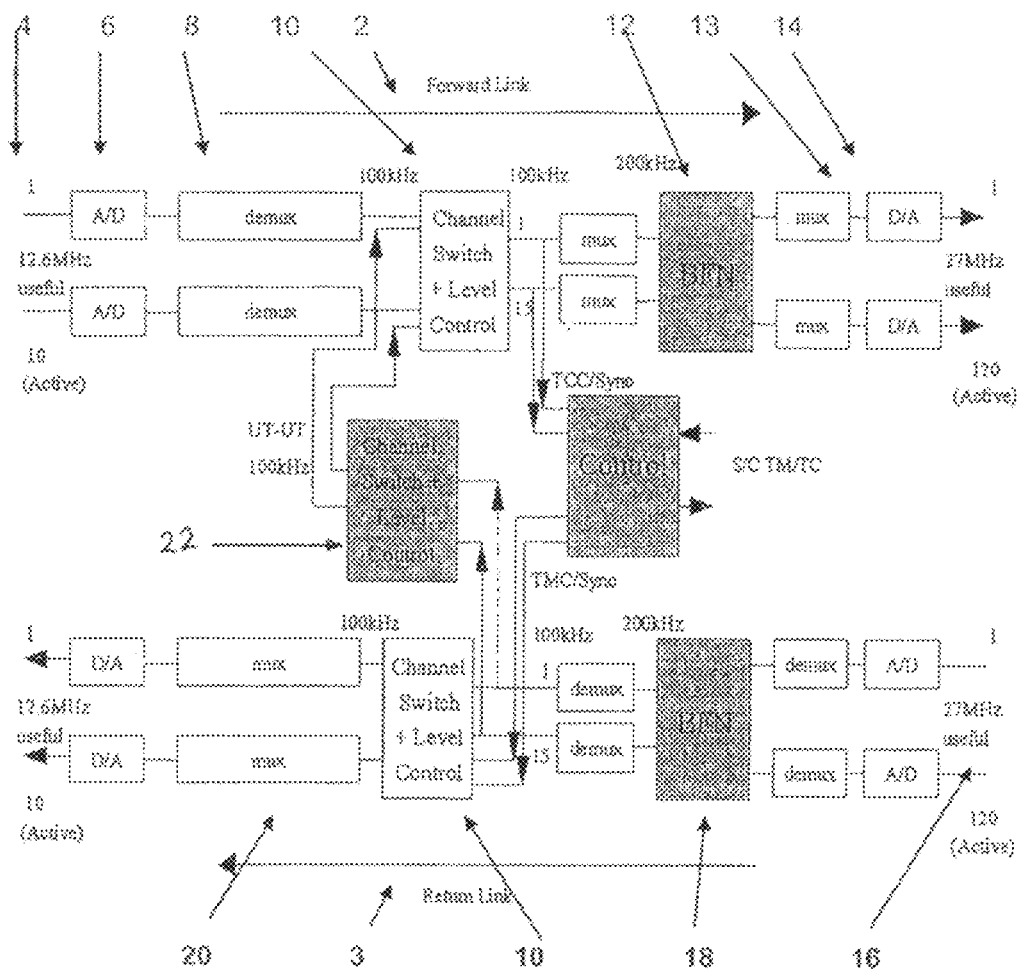
FIG. 1 is a schematic block diagram of a known system for processing uplink and downlink signals in a communications satellite, incorporating a beam-forming mechanism.

An embodiment of the invention may be incorporated in a narrow band digital beam-forming architecture, an example of which is shown in FIG. 1, where beam-forming is performed independently for each frequency channel.

A Forward Link processor 2 supports the link from a fixed Earth station C-band uplink (4-8 GHz) to a mobile terminal L-band (1-2 GHz) downlink, and a Return Link processor 3 supports the link from a mobile terminal L-band uplink to the fixed Earth station C-band downlink. The forward link receive antenna is a single feed per beam (SFPB) antenna and therefore a beamforming network is not required in relation to the forward uplink. The signals on Forward Link 2 are delivered to the processor in a number of 12.6 MHz sub-bands 4 that correspond to subdivisions of the spectrum on each of the two polarisations on the uplink. Each sub-band is sampled by an A/D converter 6. Each sub-band is demultiplexed at 8 into narrowband channels (100 kHz) using an efficient Fast Fourier Transform (FFT) filter bank (each channel typically containing a single modulated carrier). A switching function 10 is required to allow the selection of the required channels from the total sub-band spectrum and to provide flexible frequency mapping between the uplink and the downlink. Also at this point the individual channels have a programmable gain applied to them.

The channels are then routed to some or all of the downlink transmit antenna feed elements. The transmit antenna in this example is an AFR but the architecture is also applicable to a DRA or IPA. The beam properties are defined at 12 by flexible control of complex digital beam-forming weights (with multiple beams formed for each frequency channel). The individual element signals are frequency multiplexed at 13 using an FFT filter function. Element signals are D/A converted at 14 and input to post-processing chains.

The Return Link processor 3 supports the link from a mobile terminal L-band uplink to the fixed Earth station C-band downlink. The same types of processing functions are performed as in the forward link, but the data flow direction is reversed. The processor inputs are from the receive antenna elements 16. In this example, the receive antenna is an AFR but the architecture is equally applicable to a DRA or IPA. The analogue signals are converted to digital samples, which are demultiplexed to individual channels (200 kHz) before the beam-former function. The beam-former function 18 applies the complex weighting and then a summation across the elements produces the final beam-formed channel signal (with multiple beam signals formed for each frequency channel). Before multiplexing the signals at 20 for the feeder downlink, a programmable gain adjustment may be applied at 10. The return link transmit antenna is a single feed per beam (SFPB) antenna and therefore a beamforming network is not required in relation to the return downlink.

As will be described, active interference suppression according to the invention may be incorporated with beam former function 18 of the receive (mobile) antenna for the return link. Alternatively or in addition, active interference suppression according to the invention may be incorporated with beam former function 12 of the transmit (mobile) antenna for the forward link. Active interference suppression may be applied to both the receive and transmit beamforming functions, for instance for direct mobile to mobile traffic (marked at user terminal UT-UT in FIG. 1), in which user signals pass from the return uplink directly to the forward downlink, via the channel switch and level control unit 22.

Figure 2:
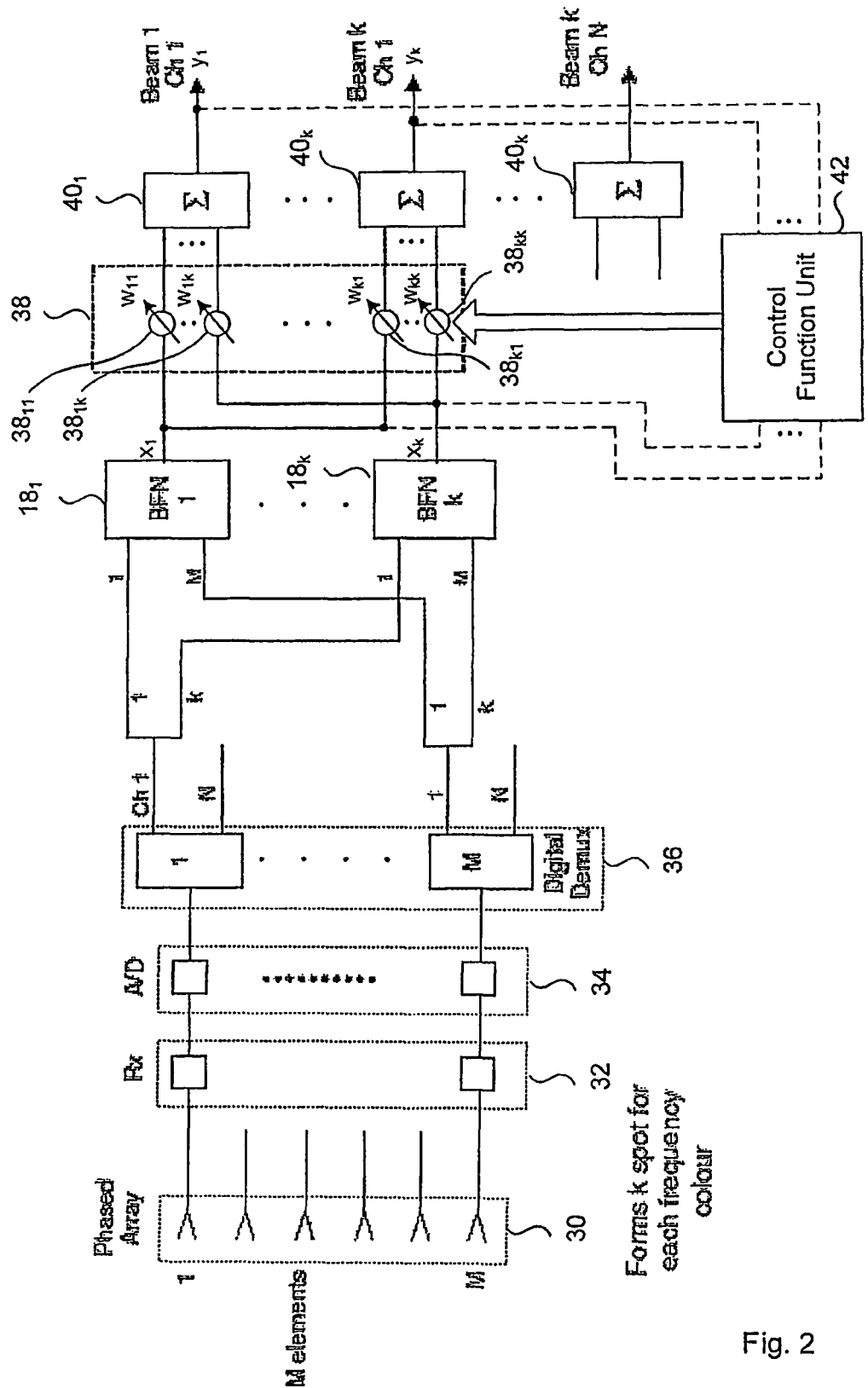
FIG. 2 is a schematic block diagram of a beam-forming arrangement, incorporating active interference suppression according to an embodiment of the invention.

FIG. 2 schematically illustrates a beam-forming arrangement for the Return Link 3 of FIG. 1 according to the present invention.

Referring to FIG. 2, the beam-forming arrangement includes a phased array 30 having M elements, in the present case in the form of a direct radiating array (DRA) antenna. The output of each of the elements is fed to a respective one of a plurality of receive units 32, each of the receive units being connected to a respective one of a plurality of analogue to digital converters (A/D) 34, and each of the A/Ds being connected to a respective one of a plurality of frequency demultiplexers 36, in the present case digital demultiplexers 36. Each of the demultiplexers 36 has N functional outputs corresponding to N frequency channels and each output of each demultiplexer 36 is connected to each of 'k' beam forming networks $18_1$ to $18_k$ for each channel, in the present case digital beam forming networks.

In the present example it is assumed that each beam formed by the beamforming networks $18_1$ to $18_k$ is synthesised from the complete set of M elements. For each beam 1 to k (of each channel 1 to N), the output ($x_1$ to $x_k$) of each beam forming network $18_1$ to $18_k$ is provided via a plurality of complex weighting units $38_{11}$ to $38_{kk}$ to a respective summing unit $40_1$ to $40_k$, the summing units also referred to as interference cancelling units. A control function unit 42, also referred to as a processing arrangement, is connected to receive inputs from the beam forming network outputs ($x_1$ to $x_k$) and the resulting interference suppressed output signals ($y_1$ to $y_k$) and is arranged to adjust complex weightings applied by the weighting units $38_{11}$ to $38_{kk}$ for each channel.

It is noted that weighted cancellation of interferers could be achieved by using low gain cancellation elements, for example individual elements of the DRA. However in cancelling the sidelobe at a given interferer location there will be potential significant perturbation in the gain within the main lobe of the beam focused on the 'wanted' user. It is a key feature of embodiments of the invention that the set of high gain spot beams sharing the same frequency channel act as mutual interference cancellation beams in a way that minimises the perturbation to the main lobe gain of the primary beam.

The architecture of FIG. 2 is also applicable to an IPA antenna and to an AFR antenna (in which a given beam for a given channel is typically formed from a subset of overall set of element feeds).

The architecture of FIG. 2 is also applicable to a SFPB antenna where the corresponding frequency channel of multiple beams contain authorised user accesses and feed directly into the complex weighting and summation circuits of FIG. 2 without the need for a BFN.

Figure 3:
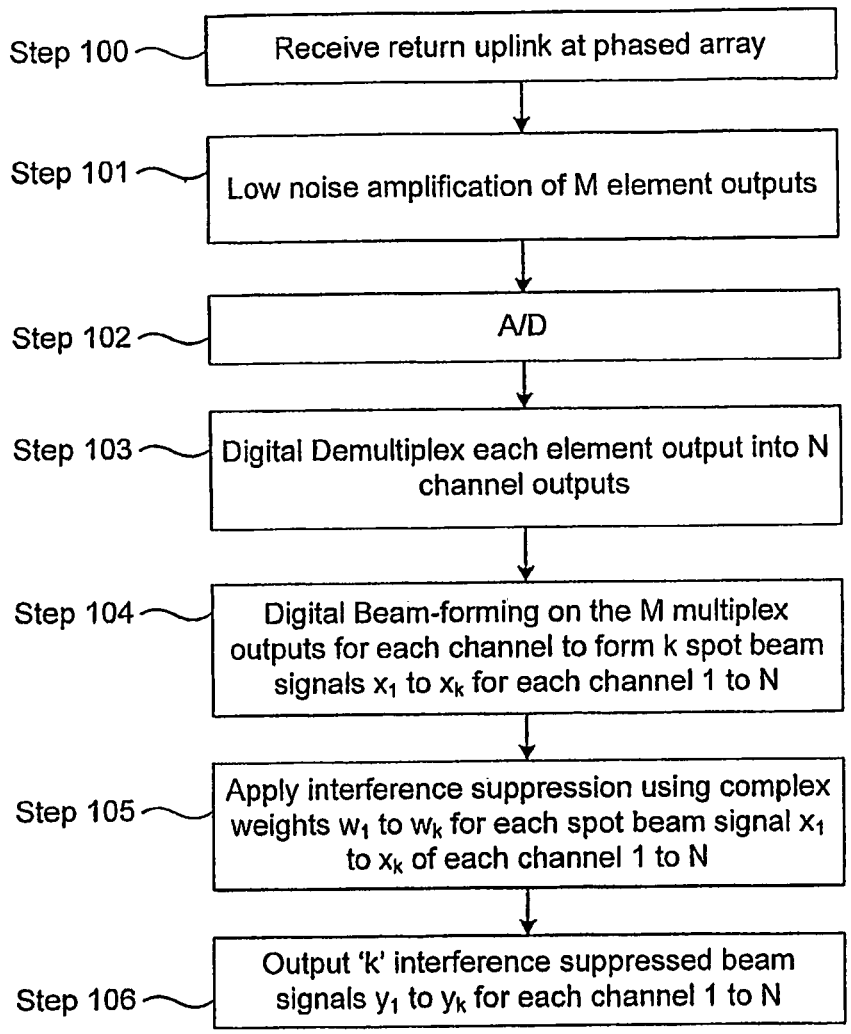
FIG. 3 is a flow diagram illustrating the steps performed in the beam-forming arrangement of FIG. 2 in suppressing co-channel interference between user signals.

FIG. 3 is a flow diagram illustrating the steps performed in the beam-forming arrangement of FIG. 2 in order to suppress co-channel interference in the output beam signals.

In use, referring to FIG. 3, the DRA receives multiple carriers on different frequencies from a series of transmit ground terminals at different locations on the earth, for instance ground stations or user terminals. Each element 30 of the DRA receives the complete system spectrum comprising the sum of the individual carriers (step 100). Following low noise amplification at the receiving units 32 (step 101), down-conversion and filtering to reject out of band signals, each element signal is sampled in A/D Converters 34 (step 102) such that the full system spectrum is defined in the form of a sequence of digital samples (at a rate consistent with the system bandwidth). The sampled signal for each element 30 is digitally frequency de-multiplexed by the digital demultiplexers 36 (step 103) to provide independent digitally sampled (complex sample) representations for each of a series of individual frequency channels 1 to N making up the overall system bandwidth. A given frequency channel may contain a single carrier or multiple carriers or a given wideband carrier may be shared across multiple channels.

A group of respective Digital Beam-Forming Networks (DBFN) $18_1$ to $18_k$ is associated with each of the N channels. A given DBFN receives the channel specific signals from each of the M elements, multiplies the samples by a complex weight that is specific to a given element and sums the weighted element contributions to form beam outputs $x_1$ to $x_k$ for each channel (step 104). The properties of the beams associated with a given frequency channel are controlled by the choice of the complex weights and may be changed over time simply by changing the weights. For example, if it is required to form a spot beam in a given direction, the weights for the beam forming network corresponding to that beam are chosen such that a linear phase gradient is formed across the aperture of the array (assumed to be planar) such that the contributions from all the elements 30 add coherently in order to maximize gain in the required direction.

Interference suppression is then applied for each of the beam signals $x_1$ to $x_k$ in each channel (step 105). In particular, for each primary beam signal in which interference is to be suppressed in each channel, the outputs ($x_1$ to $x_k$) of each beam forming network $18_1$ to $18_k$ are weighted by respective weighting units 38 and provided to a respective one of the summing units $40_1$ to $40_k$ corresponding to that primary beam of that channel. The summing units $40_1$ to $40_k$ provide interference-suppressed output beam signals ($y_1$ to $y_k$) for each channel (of the 1 to N channels) (step 106).

The weightings to be applied to the beam signals ($x_1$ to $x_k$) in each channel are applied by a set of complex weighting units $38_{11}$ to $38_{kk}$ for that channel, where, in the present example, a set of 1 to k weighting units 38 is used for generating the cancellation beams for each primary beam of each channel, by applying respective complex weights $w_{11}$ to $w_{kk}$.

Figure 4:
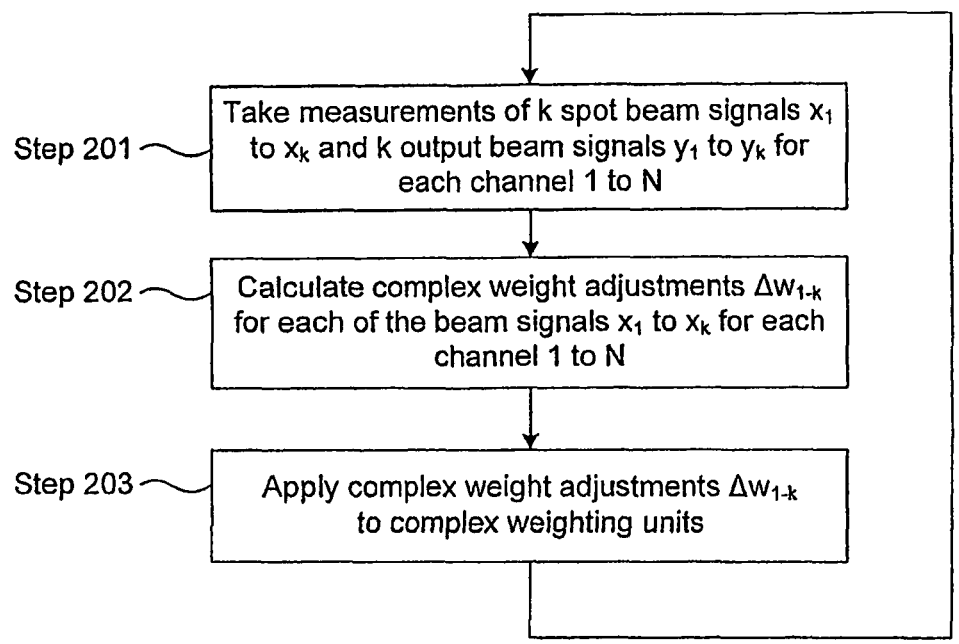
FIG. 4 is a flow diagram illustrating the steps performed by the control function unit of FIG. 2 in calculating complex weighing parameter updates for suppressing co-channel interference between user signals.

FIG. 4 is a flow diagram illustrating the steps performed by the control function unit 42 of FIG. 2 in calculating complex weighing parameter updates for suppressing co-channel interference between user signals. The routine described above with reference to FIG. 3 is, in the present case, performed alongside the routine of FIG. 4.

Referring to FIG. 4, the control function unit 42 receives the beam forming network outputs ($x_1$ to $x_k$) and the resulting beam signals ($y_1$ to $y_k$) and measurements of these values are taken (step 201). Based on the measurements, the control function unit 42 calculates updates for the complex weightings applied by the weighting units $38_{11}$ to $38_{kk}$ for each channel 1 to N (step 202). These updates are applied to the respective complex weighting units $38_{11}$ to $38_{kk}$ such that subsequent beam outputs $y_1$ to $y_k$ converge to a desired beam formation in which co-channel interference is suppressed (step 203). The process of complex weight adjustment calculations is iterative, such that each new weight adjustment is determined on the basis of the output signals resulting from one or more previously adjusted complex weights.

By adjusting the complex weightings applied by the weighting units $38_{11}$ to $38_{kk}$ for each beam 1 to k of each channel 1 to N, the control function unit 42 is able to suppress interference in a particular beam caused by other beams in that channel. Also, by applying weightings to the beams signals ($x_1$ to $x_k$) in each channel, multiple frequency channels can be processed independently and in parallel with suppression of interferers being specific to each channel. If a carrier covers multiple frequency channels, the interference in each channel of the carrier can therefore be suppressed independently and the overall interference suppression can be improved. The complex weights applied to the cancellation signals are, in the present example, applied in anti-phase such that interference in the main signal is suppressed by the cancellation signals. The system configuration may require that the weights are adjusted using a calibration factor prior to application.

The control function unit 42 applies an algorithm in order to determine the appropriate complex weightings $w_1$ to $w_k$ for each beam, as will be described in more detail below with reference to FIG. 5.

According to an embodiment of the invention, the algorithm applied in determining the complex weight adjustments $\Delta w_{1-k}$ for each output beam is based on the constant modulus algorithm (CMA).

The algorithm is designed to use the outputs $x_1$ to $x_k$ from the beamforming networks $18_1$ to $18_k$ as cancellation beams to remove interference from a particular primary 'wanted' signal. This is done by weighting each beam signal to provide a cancellation signal and adding the results to the primary beam, which can also be weighted. The primary beam will typically be a spot or other shaped beam produced by the beamforming networks $18_1$ to $18_k$.

The aim of the algorithms is to produce a set of weights $w_i$ to be applied to the primary and cancellation beams $x_i$. The sum of the weighted beams, $$\sum_i w_i^* x_i, \tag{1}$$

then gives an 'interference suppressed output signal', with the expected result that the interference is removed. The interference suppressed output signal will be identified by 'y' and can be the output from any of the summing units $40_1$ to $40_k$ for each channel.

The constant modulus algorithm is a semi-blind method of source separation that works to produce a signal of uniform envelope. The basis of this is that any interference, including co-channel interference, will tend to distort the envelope. The algorithm is designed to minimise this distortion and, thereby, the interference from co-frequency channels. This is achieved by working on the assumption that the wanted signal has a relatively constant envelope when transmitted. Such signals could, for instance, include signals having a PSK type modulated carrier such as QPSK, or a signal using another order of PSK or an alternative modulation scheme. The invention has also been shown to work with non-constant modulus modulation schemes, such as QAM. A primary source of variation of this constant envelope is due to the contribution of interference sources added to the wanted signal. Consequently, forcing a constant envelope upon the received signal can result in the removal of unwanted interferers.

The Constant Modulus algorithm is derived via the steepest decent method, based on a 'cost function', G; that is, a measure of how far the current solution is from that required. Steepest decent aims to reduce the cost function by making parameter changes that move the cost function to zero by the quickest route. In our case, it implies we should we change the weights proportional to the gradient of G:

$$\partial w / \partial t = -\mu \nabla G, \tag{2}$$

where parameter $\mu$ is a parameter that controls the convergence rate. If we adapt this for discrete weight updates, we obtain $$w[n+1] = w[n] - \mu \nabla G \tag{3}$$

The cost function to minimise is shown in Equation (4), where gamma is known as the Godard Radius:

$$G = \frac{1}{4} E\{(|y[n]|^2 - \gamma)^2\} \tag{4}$$

The 'Godard radius' gives a measure of the required signal amplitude and, as we know from equation (1), $$y = \sum_i w_i^* x_i$$

Differentiating with respect to the weight vector w yields the following error function:

$$\frac{\partial G}{\partial w} = E\{|y[n]|^2 - \gamma\} y[n] \cdot \frac{\partial y[n]}{\partial w} \tag{5}$$

$$= (x[n]^* y[n]) \cdot (|y[n]|^2 - \gamma)$$

Where x[n] is the sample of x at time n.

Requiring Equation (6) to be equal to zero therefore leads to the following update equation:

$$w[n+1] = (w[n] - \mu (x[n]^* y[n]) (|y[n]|^2 - \gamma) \tag{6}$$

An intuitive analysis of Equation (6) reveals that the algorithm is being steered by the correlation of the input vector x and the scalar output of the adaptive algorithm, y.

The control function unit 42 may select the initial weightings $w_1$ to $w_k$ for each beam to accentuate the wanted signal. When the CMA algorithm is used to accentuate a wanted signal that exhibits a constant modulus and that is surrounded by signals that do not exhibit a constant modulus, for example random noise interference, it is typically sufficient to initialise the adaptive weights to the same value. When the interference does not exhibit the constant modulus property seen in the wanted signal, the nature of the algorithm allows the wanted signal to be accentuated and all other signals to be suppressed. However, in a satellite communication system producing multiple user signals that are similar in form (all having constant modulus) all the signals appear equivalent from the algorithm point of view. If the beam weights are all initialised to the same value, the accentuated signal could be any of those input to the algorithm. According to some embodiments of the invention, this problem is solved by using the derived spot beams as the input to the algorithm and selecting the initial state of our algorithm appropriately to accentuate the derived spot beam focused on a particular location. For example, a user or the geographical location corresponding to the user is specified and the spot beam focused in the direction of the user or location is identified. According to some embodiments, the adaptive weight of the identified spot beam can be initialised to 1 and the adaptive weights of the other beams can be initialised to zero. Since the process of complex weight adjustment calculations is iterative, new weight adjustment is determined on the basis of the output signals resulting from the initial weights. In other words, by using the derived beams or spot beams as inputs and selecting the initial weights as described above, the algorithm is set closer to a beam pattern that is optimised for that user. By iteratively adjusting the weights after the initialisation, an optimised beam pattern is subsequently obtained. The initial beam weights are only used to ensure that the algorithm selects the wanted signal. The process of initialising the values can be repeated for every beam signal in every frequency channel to ensure that the wanted signals are accentuated throughout the system.

In some embodiments, the geographical locations for which it is desired to apply the interference suppressions algorithm are specified at system level in a control station on ground or in a memory on the satellite. For example, the operator of the communication satellite may decide that the signal to a particular user location should be interference suppressed and the system will then cheek for signals to that location being received or transmitted by the system. The system may determine the geographical location associated with an output beam $y_n$ to be formed by a particular set of complex weighting units $38_{11}$ to $38_{kk}$ and a particular summing unit $40_1$ to $40_k$ and specify the beam signal $x_n$ associated with the location to the algorithm. The algorithm can then be initialised to accentuate the identified beam signal $x_n$.

Figure 5:
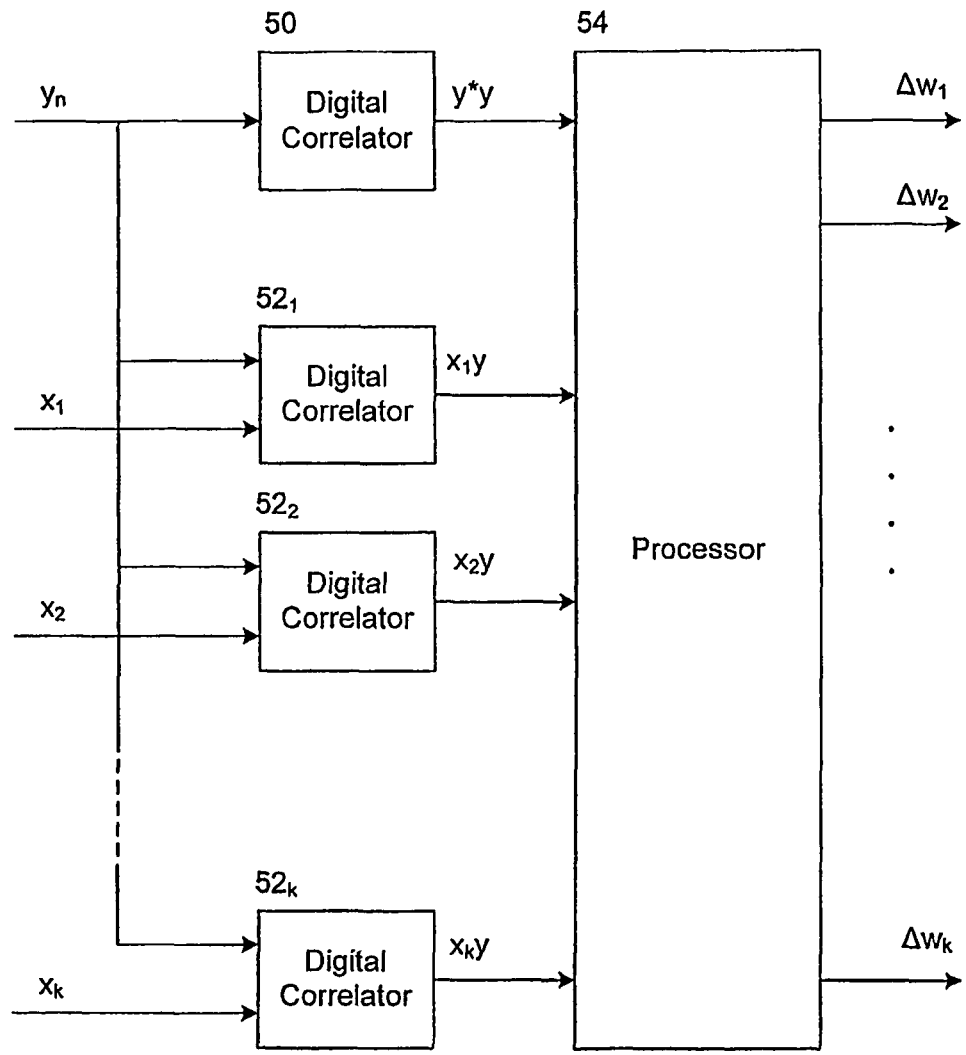
FIG. 5 is a schematic block diagram illustrating the control function of FIG. 1 in more detail.

FIG. 5 is a schematic block diagram illustrating the functional components of the control function unit 42 of FIG. 2, used to apply the Constant Modulus algorithm.

FIG. 5, in particular, illustrates the functional components for suppressing interference within one beam signal $x_n$ in a particular channel. A similar arrangement would also apply for suppressing interference in each of the other beam signals within each of the other channels.

Referring to FIG. 5, the control function unit 42 includes an output signal digital correlator 50, and first to $k^{th}$ beam signal digital correlators $52_1$ to $52_k$. A processor 54 receives the outputs from the correlators 50, 52 and applies the update algorithm to calculate updates $\Delta w_{1-k}$ of the complex weightings.

In use, the output signal digital correlator 50 receives a beam output signal $y_n$ for a particular beam in which interference is being suppressed. This is self-correlated to generate $|y|^2$, which is fed into the processor 54. First to $k^{th}$ beam signal digital correlators $52_1$ to $52_k$ correlate $y_n$ with each of the cancellation beam signals $x_1$ to $x_k$ and the resulting signals are also provided as inputs to the processor 54. The processor 54 generates the updates $\Delta w_{1-k}$ of the complex weightings for the complex weighting units 38 according to equation (6) above, where is used to control the convergence rate of the updates and to therefore provide system damping. The value of $\mu$ would usually be fixed for a particular system configuration such that the algorithm converges in an appropriate time for the communication signals concerned to provide desired interference cancellation, as would be apparent to those skilled in the art. The value of $\gamma$ is selected as a measure of the optimal signal modulus to be achieved and would normally be fixed. It is, however, possible to calculate the value from past examples, for instance $\gamma=|y|^2$, where $\gamma$ is taken from the immediately preceding or another previous cycle or is averaged over two or more previous cycles.

The processor 54, according to embodiments of the invention, also applies averaging of the weight updates before applying them in the system, for improved accuracy.

The processor 54, according to some embodiments of the invention, also sets the initial state of the algorithm to accentuate the right beam, as described above. At the system level, the geographical area or user to which the interference suppression algorithm should be applied may be determined. The system then identifies the spot beam $x_n$ associated with the geographical area and prepares instructions for the processor 54 accordingly. The instructions may be sent in a control signal to the processor. The processor may receive the control signal and may initialise the algorithm according to the specified instructions to process the set of spot beams ($x_1$ to $x_k$) comprising the identified spot beam $x_n$. The instructions may specify the initial weight to be applied to each complex weighting unit 38. Alternatively, the instructions may specify the beam of interest $x_n$ and the processor 54 may determine the initial weights necessary to accentuate the beam of interest.

In the described embodiments, the primary beam signal is weighted by a complex weighting unit in addition to the cancellation signals, and is also suppressed by the cancellation signals. According to embodiments of the invention, a weighting threshold is applied to the weighting of the primary beam signal, for instance such that its modulus does not fall below a predetermined level or such that the weighting applied to the primary beam does not limit the beam signal by more than a predetermined factor.

The present invention is also applicable for use with broadband signals, where a given wideband carrier is shared across multiple channels. In this case, the measurements performed by the control function unit 42 include contributions from a number of these channels and according modifications of the above system are necessary. For instance, referring to FIG. 5, the output signal correlator 50 would include measurements from all or almost all of the channels that the primary signal is seen in. Using too few channels could give a distorted signal with an insufficiently constant modulus. Beam signal correlators 52 may use a subset of channels successfully, although optimal operation would require the subset to be selected appropriately.

In the broadband signal case, the measurements are carried out channel-by-channel and then summed in the processor 54, where, for instance, summing of the outputs of correlator 50 is performed to ensure a sufficient number of channels are included. It might be expected that the signal would need to be reconstructed before being fed into the output signal correlator 50. However, this is not necessary. Consequently, it is possible to have a relatively fixed system architecture and to respond to different signal scenarios, such as signals which are broader than a signal channel, by adjusting parameters in the processor 54. Selection of which subsets of the beam signal correlator outputs are used to give optimal behaviour can also be made in the processor 54.

In certain circumstances, if a broadband signal is being interfered with by some narrowband signals, two different subsets from the beam signal correlators $52_1$ can be selected, one which focuses on an interferer in one channel and one which focuses on a different interferer in a different channel.

Calculations performed in the above arrangement for each of the beam signals $x_1$ to $x_k$ in each channel 1 to N can, according to an embodiment of the invention, be minimised by making use of known properties of the channels in certain circumstances. For instance, complex weight adjustments calculated for the cancellation beams in a particular channel can be altered by a predetermined ratio and applied to cancellation beams in another channel. The predetermined ratio can be determined based on the channels in question, to take account of known differences in the required weightings due to the different frequencies concerned. In such circumstances, the interference locations would be the same in both channels, such as when the invention is applied in relation to a network of feeder stations that uplink a number of different signals on different channels. It is possible to focus on one signal in one channel and apply the resulting calculations across other channels. Since the feeder stations are in fixed locations and all interfering on multiple channels, the interference locations are the same across the band.

Although specific embodiments of the invention have been described, the invention is not limited to these examples. For instance, the above described system is arranged such that each of the beam outputs $x_1$ to $x_k$ can be used as a cancellation beam. In practice, the number of cancellation beams can be reduced to focus on the users in the highest sidelobes (usually closest to the main lobe) of the antenna. A reasonable assumption will be for the directivity between main beam and first side-lobe to differ by approximately 20 dB. Interferers in the lower level side lobes will be suppressed to a greater degree. Even suppressions of 5 dB can greatly improve performance, and so it is therefore possible to consider only a subset of interferers at locations where the sidelobes are highest. The beam used to cancel a particular interferer will have very low directivity in the direction of other interferers. Thus, the cancellation signals will be somewhat independent, suggesting multiple signal suppression could be achieved using a cancellation signals in a signal-by-signal approach (dealing with one signal at a time), greatly reducing complexity.

Figure 6:
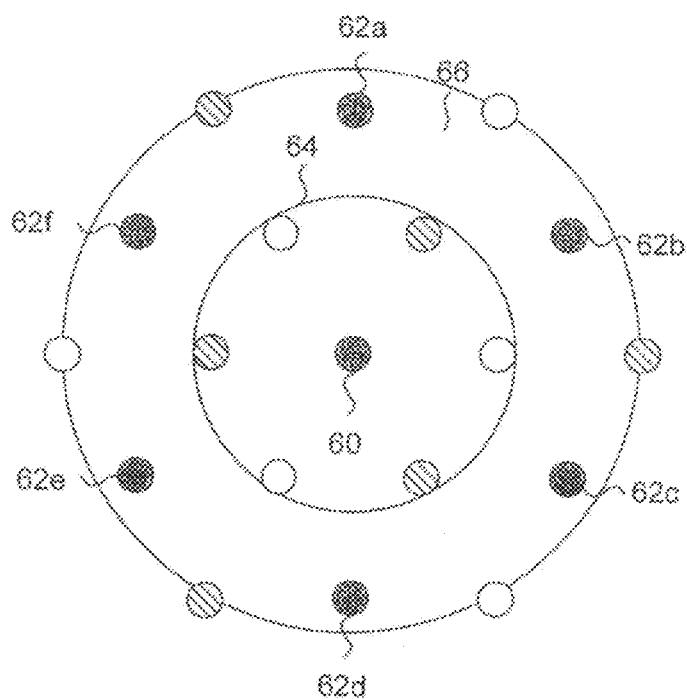
FIG. 6 illustrates an example of user beams spaced on a hexagonal grid in a frequency re-use scheme, illustrating cancellation beams according to an embodiment of the invention.

FIG. 6 illustrates an example of user beams spaced on a hexagonal grid, where a primary beam 60 is illustrated having first to sixth co-channel beams 62a-f surrounding it, these being potentially within the highest sidelobes, in the present case closest to the main beam and falling between circular lines 64 and 66 illustrated in the Figure. It is possible to use only the beams 62a-f as cancellation beams by taking advantage of the knowledge of the sidelobe structure of the main beam 60. In particular, in general, the sidelobes drop off significantly as we move outwards from the main beam 60. So, the principle interference comes from the six nearest users and advantageously the algorithm can be adapted to focus on these cancellation beams only, reducing the complexity of the system.

Although the invention has been described with reference to a DRA antenna type, the invention is also applicable to other antenna types, such as the IPA, AFR and SFPB.

In relation to the IPA antenna, the interference suppression architectures and methods described above are applicable to an IPA antenna, without any modifications being required.

For an AFR antenna, minimal adaptation of the above-described system and method are required in order to implement the interference suppression according to the invention. The beam associated with a given frequency channel is typically formed by the weighted combination of a subset of the feed signals (typically with a limited set of feeds having a high amplitude weighting to form the Main lobe and other feeds, weighted to limit side-lobe levels).

For the SFPB system, single element outputs from the antenna already form spot beams, and therefore the digital beamforming networks $18_1$ to $18_k$ described above are not required. The spot beams in such a system are typically focused on a wide area. Each feed forms a spot beam which has a number of occupied channels, with the same channel being occupied on a number of spatially separated beams. Therefore, the interference suppression is applied to corresponding frequency channel outputs from subsets of the beams.

The invention can also be applied to a transmit antenna system for signals providing a downlink. The invention is used, in particular, to reduce transmit beam gain in the specific direction of co-channel users by cancelling sidelobes by the weighted addition of co-channel beams. In one example, the same weighted interference beam architecture as described in the present application is used, but the required weights are defined from a detailed knowledge of the beam patterns used in conjunction with the knowledge of specific co-channel user locations. User locations can, for instance, be derived from the results of the interference suppression algorithm applied on the uplink to the satellite. In this way, co-channel interference between beams in the downlink can be suppressed.

The invention, although described in relation to a return link 3 of a system such as that described in FIG. 1, is also applicable to use in the forward links of satellite communication systems, for instance in association with the receive antenna for receiving the ground station uplink in FIG. 1, or in association with the transmit antenna for transmitting the downlink to the ground stations. In the example of FIG. 1 these antennas are SFPB-type antennas and do not therefore require corresponding beamforming networks. However, the invention can also be used with other antennas such as DRA, IPA or AFR antennas which can be used with beamforming networks.

The invention can also be applied to communication systems using TDMA, for instance in relation to transmit or receive beam forming for links to mobile devices. In such a system, it is possible that a given channel is being used by a number of different accesses in a given beam on a TDMA basis. Any set of interference suppression weights will apply for a given interferer location, thus a beam adjacent to such TDMA accesses will have to suppress hopping interference. Accordingly, beam weights are changed for each timeslot in a TDMA scheme. The damping factor $\mu$, used to control the convergence rate, can be adjusted in such a system in order that convergence occurs sufficiently quickly within each time slot.

Although embodiments of the invention have been described in relation to digital beamforming, the invention is not limited to this. Alternatively, an analogue beamforming arrangement can be used and analogue to digital conversion and digital demultiplexing to the beam signals resulting from the analogue beamforming. The implementation of such a system would be similar to the SFPB antenna implementation, with the addition of an analogue beamforming network.

The invention claimed is:

1. A method of suppressing co-channel interference in a satellite communication system, the satellite communication system including a receive antenna having a plurality of antenna elements, each antenna element arranged to provide a respective antenna element signal, the method comprising:
   digitising each antenna element signal, and processing each digitised antenna element signal to separate received signal components in respective frequency channels present in the element signal;
   deriving a plurality of beam signals from received signal components in one of the frequency channels;
   calculating complex weighting values for one or more of said plurality of derived beam signals in said one of the frequency channels;
   adjusting the one or more of the derived beam signals in accordance with the calculated complex weighting values; and
   cancelling co-channel interference in at least one derived beam signal in said one of the frequency channels using the one or more adjusted derived beam signals to provide an interference suppressed output signal, wherein calculating complex weighting values comprises using a constant modulus algorithm to determine the weighting values.

2. A method according to claim 1, wherein the satellite communication system further comprises a plurality of beam forming networks, the method further comprising digitally weighting, at each of said beam forming networks, with respective beam-forming weight values, said signal components in each of said frequency channels in order to derive the beam signals from the signal components.

3. A method according to claim 1, wherein the receive antenna comprises a direct radiating array antenna, an array fed reflector antenna or an imaging phased array antenna.

4. A method according to claim 1, further comprising deriving the plurality of beam signals from the received signal components by using each signal component in each frequency channel as a respective beam signal.

5. A method according to claim 4, wherein the receive antenna comprises a single feed per beam antenna.

6. A method according to claim 1, wherein calculating complex weighting values further comprises initialising the constant modulus algorithm in dependence on the geographical locations associated with the one or more of the derived beam signals to cancel interference in said at least one derived beam signal.

7. A method according to claim 1, wherein calculating complex weighting values comprises correlating each of the one or more of the derived beam signals with the interference suppressed output signal.

8. A method according to claim 1, further comprising;
   deriving a plurality of beam signals from received signal components in each of the frequency channels;
   calculating complex weighting values for one or more of said plurality of beam signals in each of the frequency channels and adjusting said one or more of the derived beam signals in accordance with the calculated complex weighting values; and
   cancelling co-channel interference in at least one derived beam signal in each of said frequency channels using the one or more adjusted derived beam signals for the respective frequency channels to provide an interference suppressed output signal.

9. A method according to claim 8, further comprising adjusting the complex weighting values calculated for one or more of the plurality of derived beam signals in a first channel in order to determine complex weighting values for one or more of a plurality of beam signals in a second channel different from the first channel.

10. Apparatus for suppressing co-channel interference in a satellite communication system, the satellite communication system including a receive antenna having a plurality of antenna elements, each antenna element configured to provide a respective antenna element signal, the apparatus comprising:
    an analogue to digital converter arrangement configured to digitize each antenna element signal;
    a plurality of demultiplexers configured to process each digitised antenna element signal to separate received signal components in respective frequency channels present in the element signal;
    a processing arrangement configured to calculate complex weighting values for one or more of a plurality of beam signals derived from the received signal components in one of the frequency channels;
    a plurality of complex weighting units configured to adjust one or more of the plurality of derived beam signals in said frequency channel to form at least one cancellation signal in accordance with the calculated complex weighting values; and
    a cancelling unit configured to cancel co-channel interference in at least one derived beam signal in said frequency channel using the at least one cancellation signal to provide an interference suppressed output signal, wherein the processing arrangement is configured to calculating the complex weighting values using a constant modulus algorithm.

11. Apparatus according to claim 10, further comprises a plurality of beam forming networks for digitally weighting, with respective beam-forming weight values, said signal components in said frequency channels in order to derive the beam signals from the signal components.

12. Apparatus according to claim 11, wherein the receive antenna comprises a direct radiating array antenna, an array fed reflector antenna or an imaging phased array antenna.

13. Apparatus according to claim 10, wherein the receive antenna comprises a single feed per beam antenna.

14. Apparatus according to claim 10, wherein the processing arrangement is configured to select initial complex weighting values to suppress interference in the at least one derived beam signal based on instructions received in a control signal.

15. A satellite communication system comprising:
    an antenna arrangement having a plurality of antenna elements, each antenna element associated with a respective antenna element signal; and
    an apparatus according to claim 10.

16. A satellite communication system according to claim 15, wherein the processor arrangement is arranged to apply a constant modulus algorithm to determine the weighting values.

17. Apparatus according to claim 10, wherein the processing arrangement is configured to calculate complex weighting values for one or more of a plurality of beam signals derived from the received signal components in each of the frequency channels, the plurality of complex weighting units are arranged to adjust the one or more of the plurality of derived beam signals in each of said frequency channels to form at least one cancellation signal for each frequency channel in accordance with the calculated complex weighting values and the cancelling unit is configured to cancel interference in at least one derived beam signal in each of said frequency channels using the at least one cancellation signal for the respective frequency channel to provide an interference suppressed output signal.

18. A method of suppressing co-channel interference in a satellite communication system, the satellite communication system including an antenna having a plurality of antenna elements, each antenna element associated with a respective antenna element signal, the method comprising:
- generating a plurality of beam signals in each of a plurality of frequency channels, the beam signals corresponding to one or more of the antenna element signals;
- calculating complex weighting values for one or more of the beam signals in one of the frequency channels;
- adjusting said one or more of the beam signals in accordance with the calculated complex weighting values; and
- cancelling co-channel interference in at least one of the beam signals in said one of the frequency channels using the one or more adjusted beam signals to provide an interference suppressed output signal, wherein the antenna comprises a receive antenna and wherein the satellite communication system further comprises a plurality of analogue beam forming networks, the method further comprising adjusting, at each of said analogue beam forming networks, the gain and phase of a plurality of the antenna element signals in order to derive the beam signals.

19. A method according to claim 18, wherein the antenna comprises a transmit antenna.

20. A method according to claim 19, wherein the satellite communication system further comprises a plurality of analogue beam forming networks, the method further comprising deriving, at each of said analogue beam forming networks, each of the antenna element signals based on the beam signals.

21. Apparatus for suppressing co-channel interference in a satellite communication system, the satellite communication system including an antenna having a plurality of antenna elements, each antenna element associated with a respective antenna element signal, the apparatus comprising:
- a signal processing arrangement arranged to generate a plurality of beam signals in each of a plurality of frequency channels, the beam signals corresponding to one or more of the antenna element signals;
- a processor arrangement configured to calculate complex weighting values for one or more of the beam signals in one of the frequency channels;
- a plurality of complex weighting units configured to adjust the one or more of the beam signals in accordance with the calculated complex weighting values; and
- a cancelling unit configured to cancel co-channel interference in at least one of the beam signals in said one of the frequency channels using the one or more adjusted beam signals to provide an interference suppressed output signal, wherein the antenna comprises a receive antenna and wherein the satellite communication system further comprises a plurality of analogue beam forming networks arranged to adjust the gain and phase of a plurality of the antenna element signals in order to derive the beam signals.

22. Apparatus according to claim 21, wherein the antenna comprises a transmit antenna.

23. Apparatus according to claim 22, wherein the satellite communication system further comprises a plurality of analogue beam forming networks for deriving the antenna element signals based on the beam signals.

24. A satellite communication system comprising:
- an antenna arrangement having a plurality of antenna elements, each antenna element associated with a respective antenna element signal; and
- an apparatus according to claim 21.

25. A satellite communication system according to claim 24, wherein the processor arrangement is arranged to apply a constant modulus algorithm to determine the weighting values.

* * * * *